US008683883B2

(12) United States Patent
Kraft (10) Patent No.: US 8,683,883 B2
(45) Date of Patent: Apr. 1, 2014

(54) BALL AND PISTON ROTARY ACTUATOR MECHANISM

(76) Inventor: Brett W. Kraft, Overland Park, KS (US)

( * ) Notice: Subject to any disclaimer, the term of this patent is extended or adjusted under 35 U.S.C. 154(b) by 654 days.

(21) Appl. No.: 12/806,982

(22) Filed: Aug. 25, 2010

(65) Prior Publication Data
US 2011/0094325 A1    Apr. 28, 2011

Related U.S. Application Data

(60) Provisional application No. 61/279,853, filed on Oct. 27, 2009.

(51) Int. Cl.
*F16H 55/00*    (2006.01)

(52) U.S. Cl.
USPC .............. 74/89; 74/89.21; 74/490.05; 901/19

(58) Field of Classification Search
USPC ......... 74/89, 89.2, 89.21, 490.05; 901/19, 22, 901/25; 77/89, 89.2, 89.21, 490.05; 92/137, 92/138, 140
See application file for complete search history.

(56) References Cited

U.S. PATENT DOCUMENTS

| | | | | |
|---|---|---|---|---|
| 2,869,377 A | * | 1/1959 | Pieterse | 74/216.3 |
| 3,009,723 A | * | 11/1961 | Patrignani | 292/33 |
| 3,593,588 A | * | 7/1971 | Hulse | 74/29 |
| 4,656,780 A | * | 4/1987 | Miyauchi et al. | 49/348 |
| 6,289,788 B1 | * | 9/2001 | Holtom | 92/137 |

FOREIGN PATENT DOCUMENTS

JP    2007-285314    * 11/2007

* cited by examiner

*Primary Examiner* — William C Joyce
(74) *Attorney, Agent, or Firm* — John C. McMahon (57) ABSTRACT

A rotary actuator mechanism for applying torque to a shaft and comprising an actuator housing forming an actuator path that includes an actuator pinion rotatably supported in said housing and having said shaft secured thereto. The pinion having peripheral notches of a selected shape and positioned within the actuator path. The mechanism having a train of discrete actuator elements having opposite ends and positioned in the actuator path, each of the actuator elements being of said selected shape to enable reception in the peripheral notches, a plurality of the elements engaging the notches. The mechanism having at least one linear actuator supported by the housing and engaging one of the ends of the train of actuator elements, the linear actuator being selectively activated to push the train of discrete actuator elements through the actuator path to thereby serially engage the actuator elements with the notches of the pinion and thereby apply torque to the shaft.

19 Claims, 9 Drawing Sheets

BALL AND PISTON ROTARY ACTUATOR MECHANISM

CROSS-REFERENCE TO RELATED APPLICATIONS

This application claims the benefit of U.S. Provisional Patent Application Ser. No. 61/279,853, filed Oct. 27, 2009 and incorporated by reference herein.

BACKGROUND OF THE INVENTION

The present invention is broadly directed to actuator mechanisms and, more particularly, to embodiments of a ball and piston rotary actuator mechanism using linear actuators to pivot a first structure relative to a second structure.

Many robotic devices utilize robotic arms or arm like structures (herein generally referred to as arms) for conducting work at a site of use. Often such robotic arms are utilized in environments which are dangerous or hazardous to humans, such as deep sea construction or exploration, chemical or explosives handling, outer space construction and the like. An example of such use of robotic arms is described in U.S. Pat. No. 4,648,782, which is incorporated herein by reference.

A robotic arm generally includes an elongated arm member which is pivotally connected to another structure, such as a support base or another robotic arm member. Some sort of motor is engaged between the arm member and the other structure to cause relative pivotal movement therebetween. The type of motor used depends on the intended function of the robotic arm. For high torque applications, it has been common to provide parallel sets of push/pull hydraulic cylinder arrangements which linearly move a rack gear engaged with a pinion gear secured to a shaft to which another arm is attached. One problem with such an arrangement is that one set of cylinders typically projects from the end of the arm. In some situations, such projecting cylinders can limit range of motion of the attached arm and are also vulnerable to damage by unintended contact with other structures.

Another approach to robotic arm articulation has involved vane motors. A vane motor typically has an annular chamber in fluid pressure between a fixed vane member and a movable vane connected to a shaft causes the movable vane to move thereby applying torque to the shaft. A problem with vane motors is a rotary stroke of less than 360 degrees because of space taken up by the fixed and movable vanes. In some robotic applications, a pivot range of greater than 360 degrees is desirable.

SUMMARY OF THE INVENTION

The present invention provides an improved rotary actuator mechanism which is compact and which can be implemented with a range exceeding 360 degrees.

The rotary actuator mechanism includes a notched actuator pinion rotatably mounted in an actuator housing which defines an actuator path impinging on the notched pinion secured to an output shaft, a train of discrete actuator elements having opposite ends and positioned in the actuator path with at least one actuator element engaging a notch in the pinion, and at least one linear actuator engaging an end of the train of actuator elements. The linear actuator is activated to push the train of actuator elements to serially engage the notches of the pinion to thereby apply torque to the shaft.

More particularly, an embodiment of the rotary actuator includes an actuator housing forming a U-shaped actuator path. An actuator pinion is rotatably mounted in the housing and has a plurality of spherical notches formed in a periphery of the pinion. The pinion is positioned in the housing such that the U-shaped portion of the path passes around a portion of the pinion. A train of discrete, spherical actuator elements or actuator balls are positioned in the actuator path with a plurality of the actuator balls engage the spherical notches in the pinion. A pair of hydraulic actuators or cylinders are secured in spaced apart parallel relation on the housing and communicate with the actuator path. Each of the cylinders includes a piston which is engaged with a respective end of the ball train. The actuator path may be partially defined by a ramp structure to guide the balls onto the pinion and from the pinion back into straight legs of the U-shaped actuator path. Thus, the housing and the pinion form a curved or bight section of the actuator path, while the ramp structure and portions of the cylinders form straight leg sections of the actuator path.

The cylinders are activated in coordination to reversibly push the balls through the actuator path and serially engaging the notches in the pinion to rotate it and thereby apply torque to a shaft or other torque transfer element secured to the shaft. The cylinders are provided with suitable valves so that as one cylinder is being filled with hydraulic fluid, the other cylinder is exhausting fluid from its chamber.

An actuator housing is secured to one or both ends of a robotic arm and is activated to pivot the arm relative to another structure or to pivot another structure, such as a second robotic arm, relative to the first arm. The cylinders may be mounted entirely within the robotic arm structure so as to form a compact rotary actuator mechanism for a robotic arm.

While the present invention is quite useful as an actuator over a wide range of external pressures and in conjunction with the need for more or less tight control (precision control) over the device in which the actuator is used, the actuator of the present invention provides special advantages where used in environments under comparatively high pressure (for example, 3000 pounds per square inch pressure) and/or where very precise movements are to be controlled by the actuator. In particular, in some embodiments the piston driver can be hydraulically locked in position without leakage, so that a position can be precisely held while applying force or under load. In other embodiments, because the individual actuator elements are generally inelastic in both compression and stretch, movement is controlled precisely and without compression or stretch that can occur in some types of actuators. Therefore, for some embodiments the present actuator provides one or more of the advantages of being lockable in position, stiff and precise in movement under control of a user, operates with zero leakage when locked and/or may operate under high external pressure conditions.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
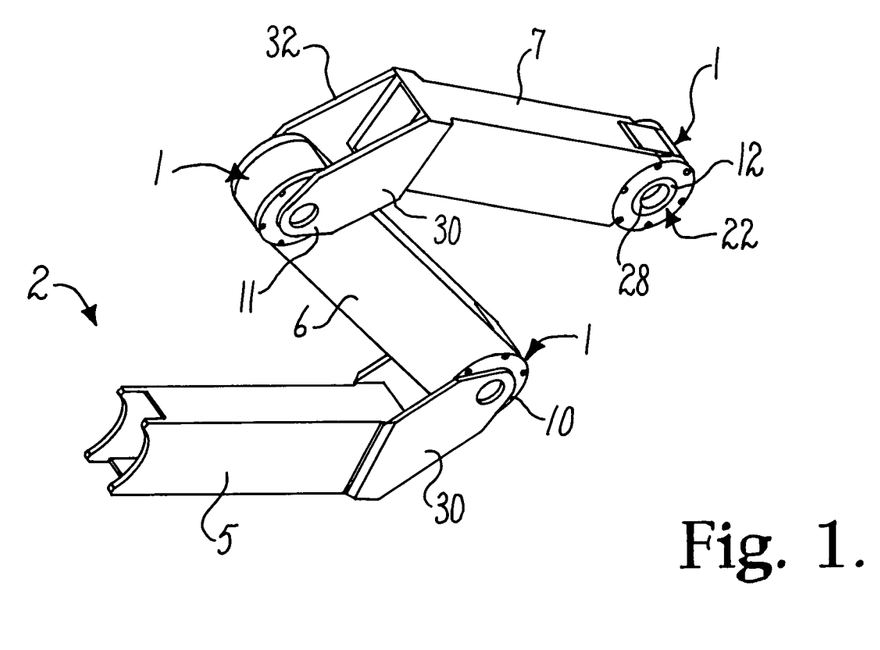
FIG. 1 is a perspective view of a multi-link robotic arm assembly in which an embodiment of a ball and piston rotary actuator mechanism of the present invention is installed.

Referring to the drawings in more detail, the reference numeral 1 (in FIGS. 1-11) generally designates an embodiment of a ball and piston rotary actuator mechanism according to the present invention. The mechanism 1 is controlled to cause relative pivoting between structures interconnected by the mechanism 1, such as between components of a robotic arm assembly 2 (FIG. 1).

The illustrated robotic arm assembly 2 includes a base link or base 5 to which is pivotally connected a first robotic arm member 6 and a second robotic arm member 7 pivotally connected to the first arm member 6. The second arm member 7 may have an additional robotic arm member (not shown) connected to its outer end, a robotic gripper or hand assembly (not shown) or the like. The mechanism 1 is applied to the illustrated robotic arm assembly 2 in multiple locations to form a first pivotal arm joint 10 between the first arm member 6 and the base link 5, a second pivotal arm joint 11 between the first arm member 6 and the second arm member 7, and a third pivotal arm joint 12 between the second arm member 7 and another structure (not shown).

Figure 2:
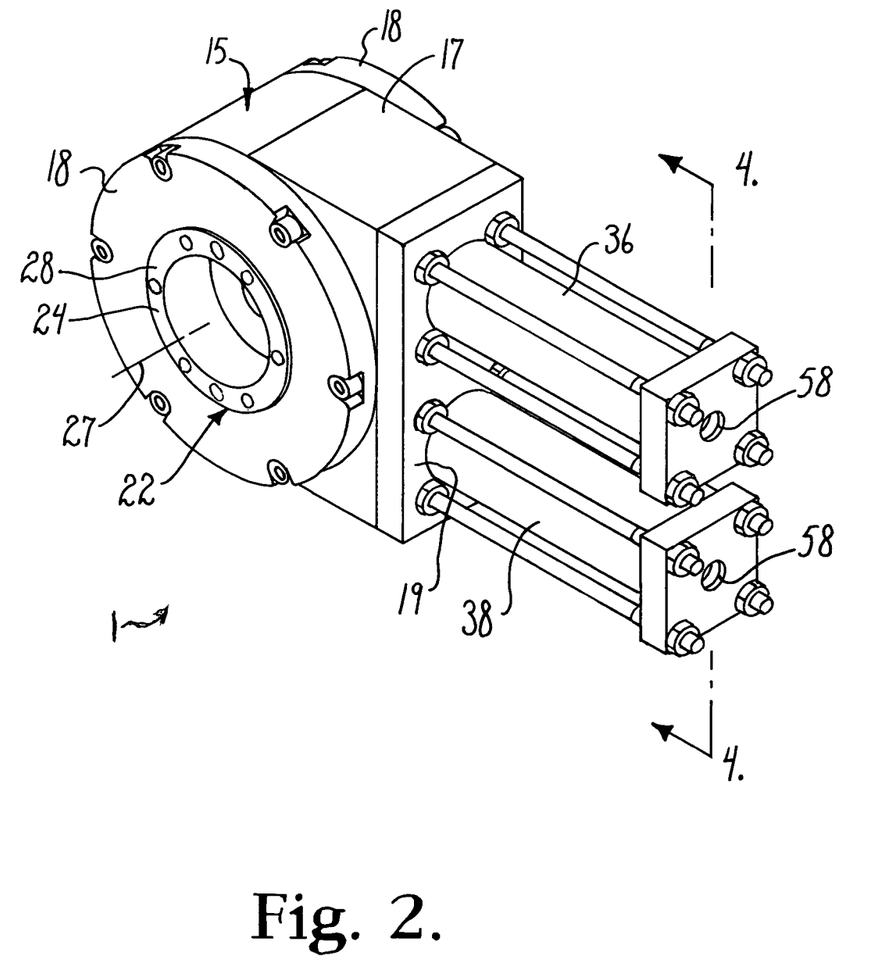
FIG. 2 is a perspective view of an embodiment of a ball and piston rotary actuator mechanism according to the present invention, shown with an annular torque transfer element.
Figure 3:
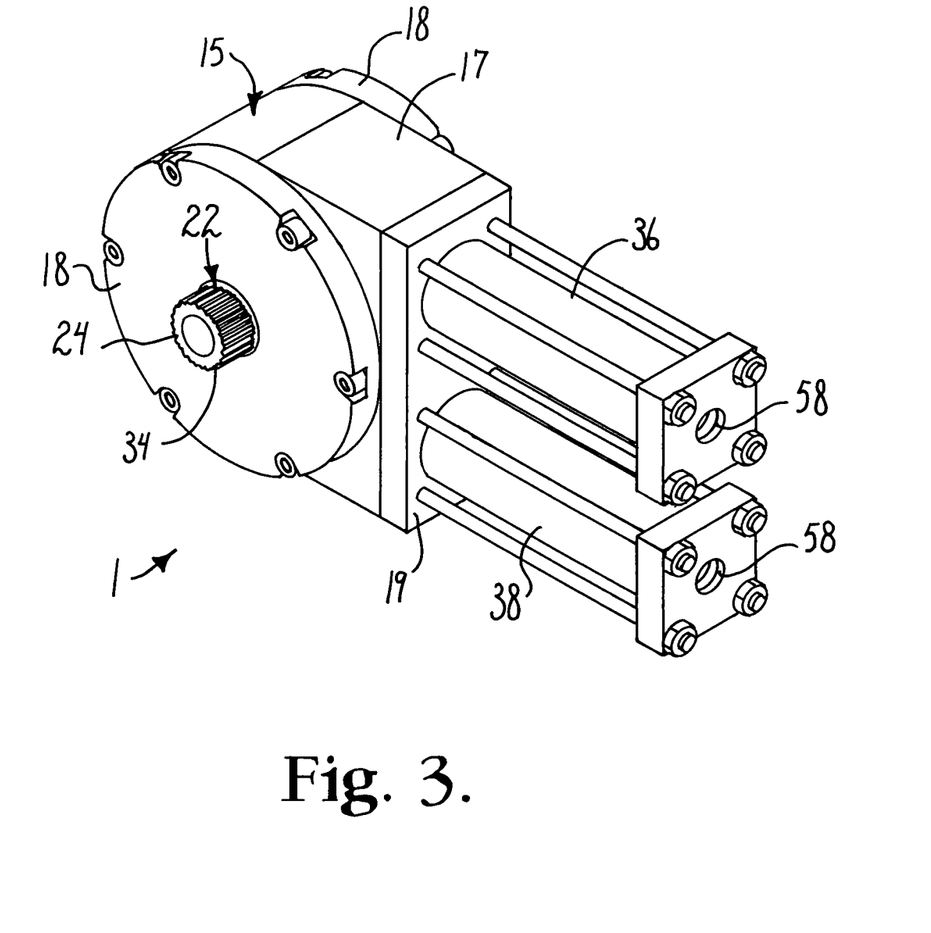
FIG. 3 is a perspective view of another embodiment of a ball and piston rotary actuator mechanism with a pinion gear torque transfer element.

Referring to FIG. 2, the illustrated actuator mechanism 1 includes an actuator housing 15 including a U-shaped main wall 17, a pair of opposite side walls 18, and a rectangular end wall 19. The main wall 17 encloses top and bottom sides and an outer end 19 of the housing 15. The side walls 18 of the enclosure 15 rotatably support an actuator rotor assembly 22 including at least one externally accessibly torque transfer element 24 and an internal shaft 26 (FIGS. 4 and 5) for rotation about an actuator rotor axis 27. The embodiment of the mechanism 1 illustrated in FIG. 2 has a torque transfer element 24 in the form of a torque transfer ring 28. In many configurations, the housing 15 has torque transfer elements 24 accessible through both side walls 18, as is shown in FIG. 1 in which joint connection yokes 30 and 32 that are secured respectively to robotic arm members 5 and 7, are secured to pairs of torque rings 28 accessible at opposite sides of the robotic arm member 6 at joints 10 and 11 of the robotic arm assembly 2. Alternatively, the torque transfer element 24 can be provided in other forms, such as a splined or other non-round shaft 34, as shown alternatively in FIG. 3, a cylindrical shaft (not shown), a gear member, or the like. The end wall 19 completes the housing 15 and provides support for a pair of linear actuator members 36 and 38.

Figure 4:
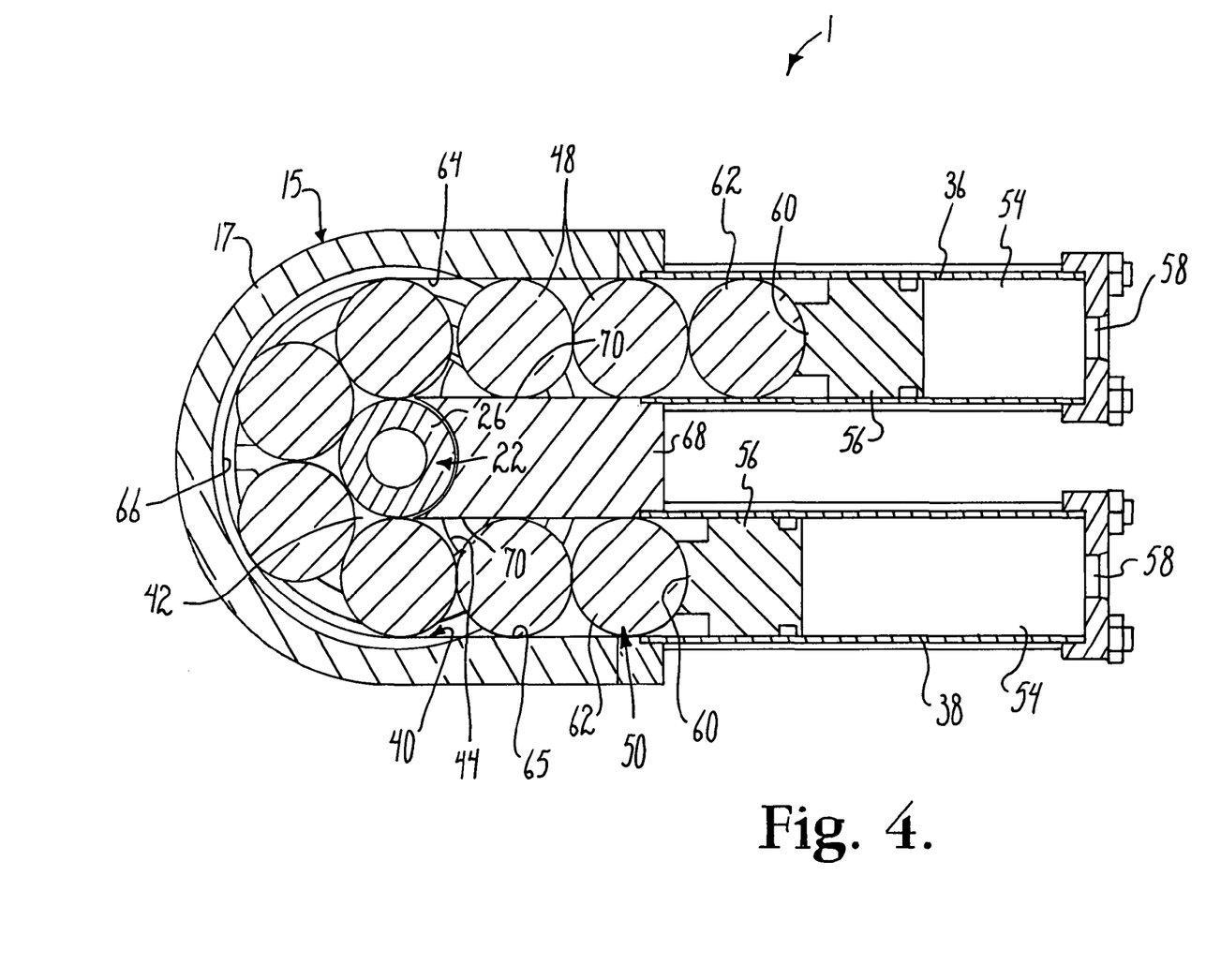
FIG. 4 is an enlarged cross sectional view taken on line 4-4 of FIG. 2 and illustrates internal details of an embodiment of the ball and piston rotary actuator mechanism.
Figure 5:
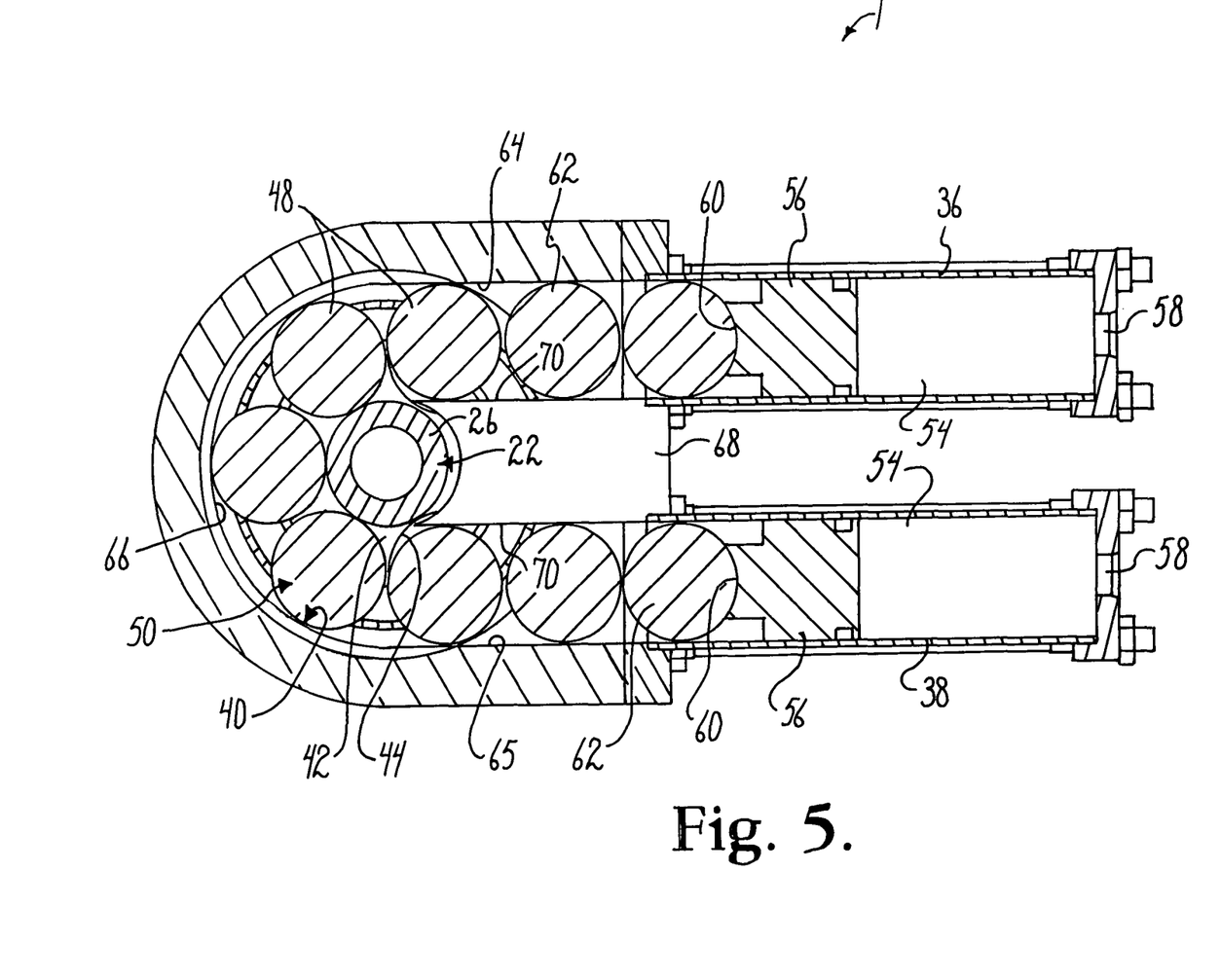
FIG. 5 is an enlarged cross sectional view similar to FIG. 4 and shows the ball train in an alternative position within an actuator path of the actuator mechanism.
Figure 6:
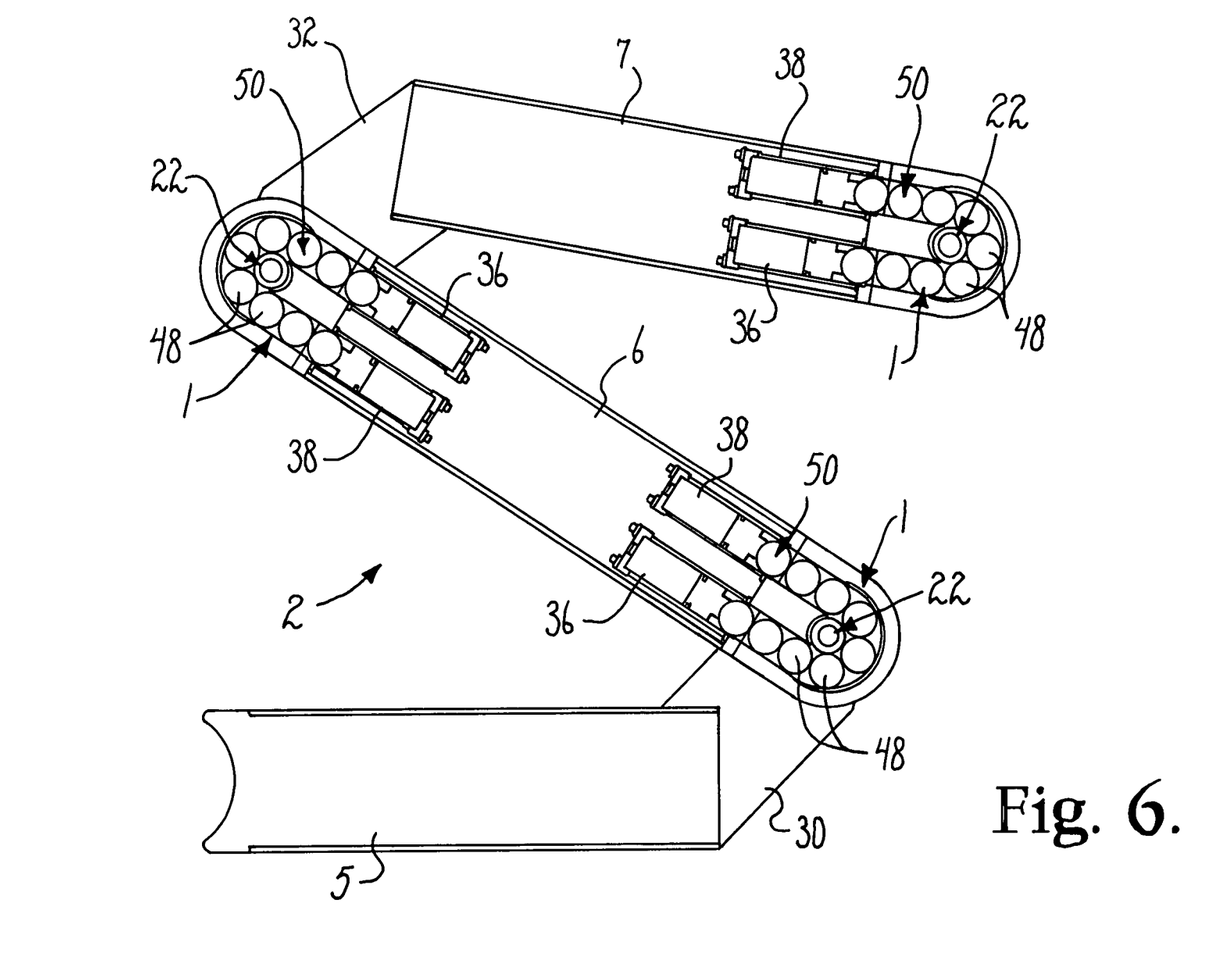
FIG. 6 a diagrammatic side elevational view of a multi-link robotic arm assembly with walls broken away to illustrate the incorporation of three ball and piston rotary actuator mechanisms according to the present invention, including internal details of the mechanisms.
Figure 10:
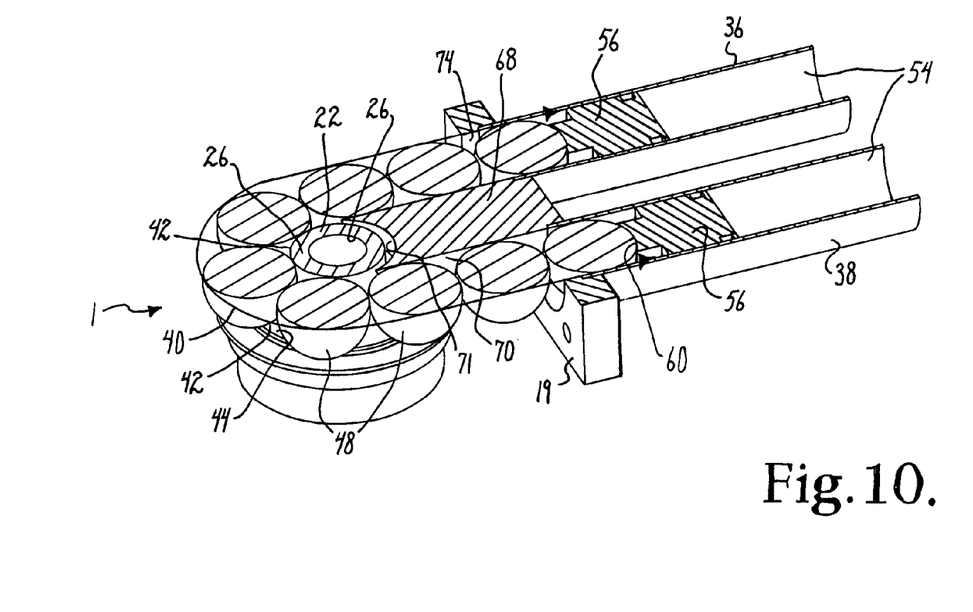
FIG. 10 is a cross-sectional view of the actuator mechanism, taken along the line 10-10 of FIG. 8 with the exterior phantom lines removed to better show interior structure thereof.
Figure 12:
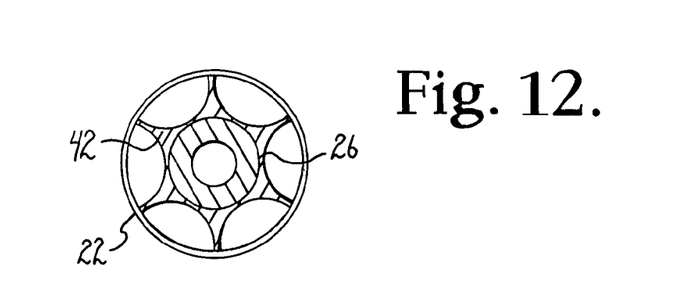
FIG. 12 is a cross-sectional view of the actuator rotor assembly, taken along line 12-12 of FIG. 11.

Referring to FIGS. 4 and 5, the housing 15 cooperates with the linear actuators 36 and 38 to form or define a U-shaped actuator path 40, see especially FIG. 10, extending from the linear actuator 36 and around the actuator rotor 22 to the linear actuator 38. The actuator rotor 22 includes an actuator pinion member 42 which is secured to the internal shaft 26. The pinion member 42 has a plurality of pinion notches 44 formed radially thereinto, spaced circumferentially about the pinion member 42, and positioned to impinge or be tangent with the U-shaped actuator path 40. The notches 44 are sized and shaped to receive discrete actuator elements 48 therein. The actuator elements 48 collectively form an actuator train 50 which is positioned within the U-shaped actuator path 40 from one linear actuator 36 to the opposite linear actuator 38. In the embodiment of the mechanism 1 shown in FIGS. 4 and 5, the actuator elements 48 are spherical elements in the nature of ball bearings or actuator balls. Thus, the pinion notches 44 are also spherical in shape, and the U-shaped path 40 has a circular cross-sectional shaped. It is foreseen that the actuator elements 48 could have alternative shapes, such as cylindrical that are suitable for rolling along an approximately shaped U-shaped path.

The illustrated linear actuators 36 and 38 are hydraulic cylinders, each having an elongated cylindrical fluid chamber 54 and a piston 56 sealingly positioned within the chamber and slidable therealong. Each chamber 54 communicates with a hydraulic fluid port 58 through which pressurized hydraulic fluid is injected into the chamber 54 to linearly move the piston 56 or through which fluid can be exhausted by the coordinated action of hydraulic valves (not shown), in a conventional manner. Each of the pistons 56 has a spherically cupped contact surface 60 which engages a respective end element 62 of the train 50 of actuator elements 48.

The linear actuators 36 and 38 are illustrated as positioned in spaced apart parallel relation to align respectively with straight portions 64 and 65 respectively of the U-shaped path 40, which are interconnected by a substantially 180 degree curved or bight section 66 of the path 40. The illustrated mechanism 1 is provided with a recup or ramp block 68 with opposite parallel surfaces 70 to guide the balls 48 into the notches 44 of the pinion 42 and from the notches 44 back into the straight portions 64 and 66, of the path 40. The ramp block 68 is shown joined to end wall 19 in FIG. 9 separate from the remainder of the mechanism 1 to better show the detail thereof. The ramp block 68 has a curved wall 71 opposite the end wall 19 that operably slidably abuts or is positioned closely adjacent to the internal shaft 26, as seen in FIG. 10. It is foreseen that the linear actuators 36 and 38 could have angular relationships other than 180 degrees. And while the linear actuators 36 and 38 are illustrated as both being active actuators, it is foreseen that one of the linear actuators could be replaced by a return spring (not shown).

In operation of the ball and piston rotary actuator mechanism 1, the linear actuators 36 and 38 operate in opposition to reversibly push the train 50 of discrete actuator elements or balls 48 through the U-shaped path 40, serially engaging the balls 48 with the notches 44 in the actuator pinion 42, thereby creating a moment about the actuator rotor axis 27, resulting in torque applied to the actuator rotor assembly 22. As hydraulic fluid is injected under pressure into the chamber 54 of the actuator 36, the piston 56 engages the cupped surface 60 with the end ball 62 of the ball train 50, thereby pushing the ball train 50 about the pinion 42 and against the piston 56 of the actuator 38 and creating counterclockwise torque (as viewed in FIGS. 4 and 5) in the rotor 22, as fluid is exhausted from the actuator 38. The operation to create clockwise torque in the rotor 22 is reversed as the chamber 54 of the actuator 38 is pressurized as the chamber 54 of the actuator 36 is exhausted.

Torque applied to the actuator rotor 22 causes a structure secured to the torque transfer element 24 to be pivoted, such as the robotic arm member 7 relative to the arm member 6, or causes the structure in which the mechanism 1 is mounted to pivot, such as the arm 6 relative to the base link 5. As is shown particularly in FIG. 6, the linear actuators 36 and 38 are mounted entirely within the arm members 6 and 7 to provide a compact configuration of a rotary actuator mechanism.

Figure 7:
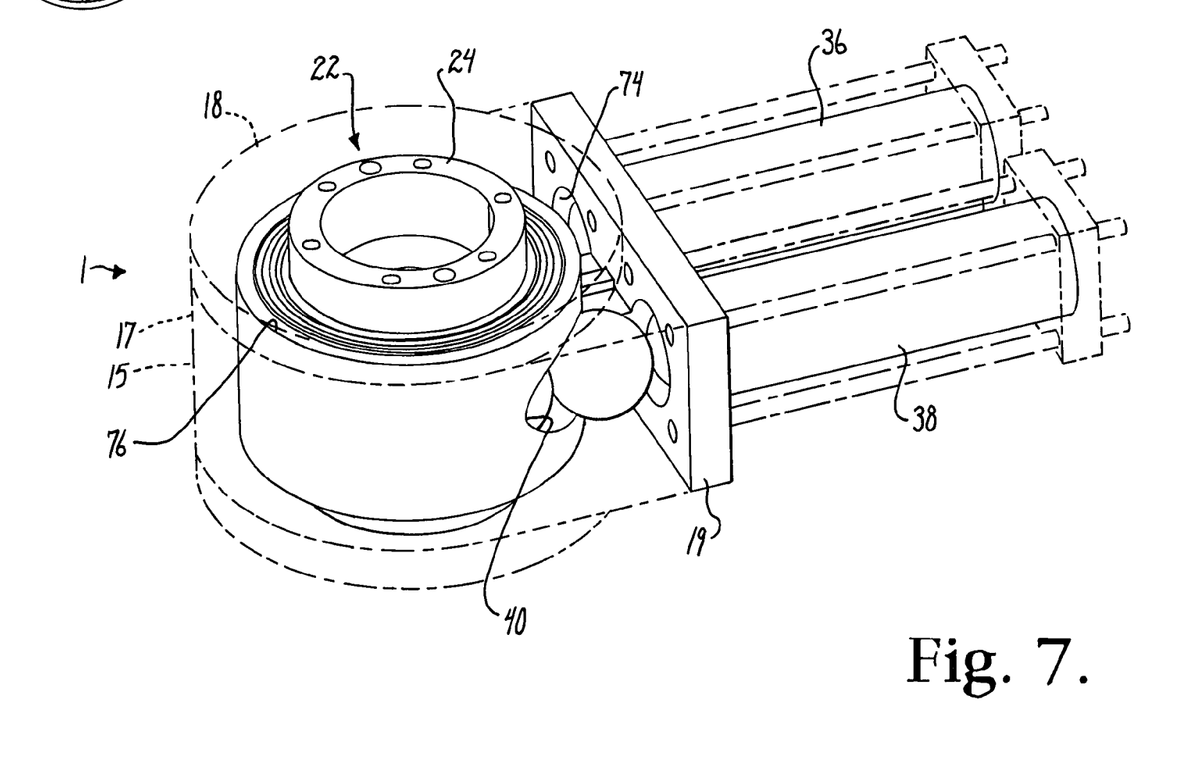
FIG. 7 is a perspective view of the actuator mechanism of FIG. 2 with exterior portions shown in phantom to better illustrate the interior thereof.
Figures 8, 11:
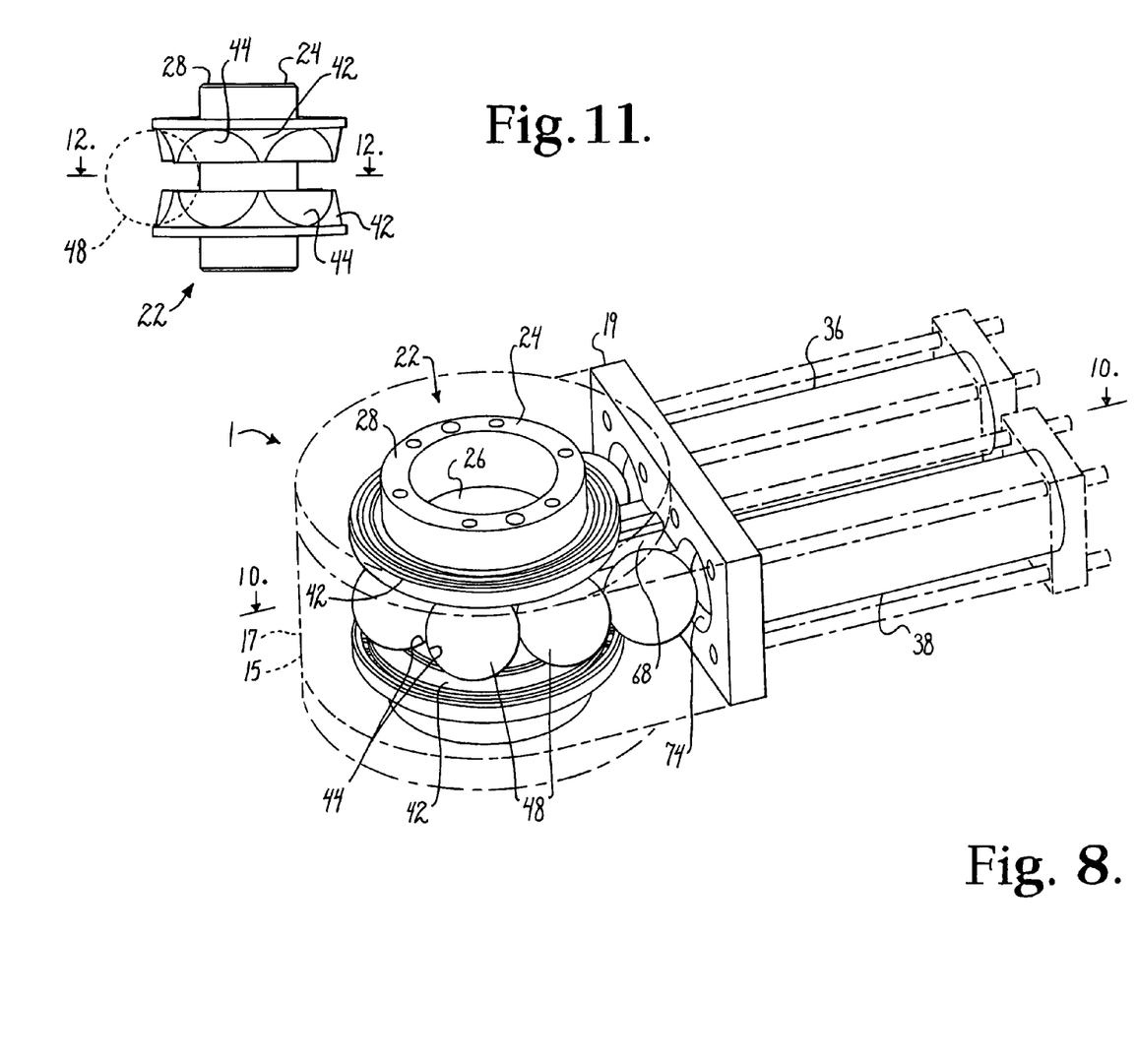
FIG. 8 is a perspective view of the actuator mechanism of FIG. 2, similar to the view of FIG. 7 except with an outer U-shaped pathway removed and with the exterior portion shown in phantom to better illustrate the interior thereof.
FIG. 11 is a side elevational view of an actuator rotor assembly of the actuator mechanism of FIG. 2 on a reduced scale, also showing a single ball shaped actuator element in phantom, so as to better illustrate the relationship of actuator elements with the rotor assembly.
Figure 9:
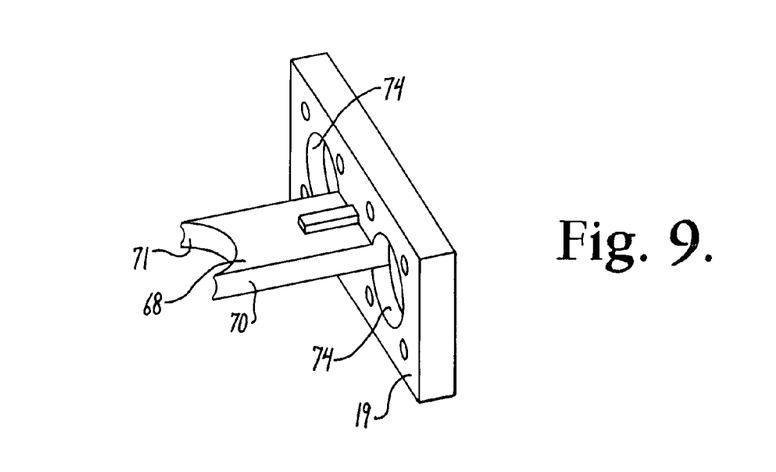
FIG. 9 is an enlarged perspective view of a wall and recup block structure of the actuator mechanism of FIG. 2.

The end wall 19 has a pair of spaced bores or apertures 74 sized sufficiently large to allow passage of the actuator elements 48 therethrough. FIG. 7 shows the mechanism 1 with the actuator housing 15 in phantom showing the inner surface 76 of the housing 5 to provide greater detail of the interior. FIG. 8 shows both the actuator housing 15 and its inner surface 76 in phantom to show even greater detail of the interior of the mechanism 1. FIG. 10 is a cross-section of FIG. 8 showing interior detail with all phantom lines removed. FIG. 9 is an enlarged and separated view of the end wall 19 and ramp block 68 to better illustrate their detail and FIG. 11 is a similar stand alone view of the rotor assembly 22.

While the illustrated linear actuators 36 and 38 are hydraulic in operation, it is foreseen that the linear actuators 36 and 38 could be of other configurations, such as pneumatic, electromotive, or the like. And while the rotary actuator mechanism 1 is described in association with a robotic arm assembly 2, other advantageous applications of embodiments of the ball and piston rotary actuator mechanism 1 are foreseen.

In use the mechanism 1 works by utilizing the actuator members 36 and 38 to alternatively drive to actuator members 48 (here balls) about the U-Shaped path 40. The path 40 is defined by a portion of each actuator member 36 and 38, the bores 74 in the end wall 19 and the space between U-Shaped main wall 17, the rotor assembly 22 and the side walls 18. As the actuator members 48 traverse the path 40 each engages and is received in a pinion notch 48 of the actuator rotor assembly 22. Movement of the actuator members 48 in either direction along the path 40 causes corresponding movement (here rotation) of the actuator rotor assembly 22 and subsequently any element joined to the assembly 22 rotates about the axis thereof.

It is to be understood that while certain forms of the present invention have been described and illustrated herein, it is not to be limited to the specific forms or arrangement of parts described and shown.

What is claimed and desired to be secured by Letters Patent is:

1. A rotary actuator mechanism for applying torque to a shaft and comprising:
   (a) an actuator housing forming an actuator path including a curved portion;
   (b) an actuator pinion rotatably supported in said housing and having said shaft secured thereto, said pinion having peripheral notches of a selected shape and positioned within said curved portion of said actuator path;
   (c) a train of discrete actuator elements having opposite ends and positioned in said actuator path, each of said actuator elements being of said selected shape to enable reception in said peripheral notches, a plurality of said elements engaging said notches;
   (d) said path being formed in part by a block extending into said pinion to position a surface thereof closely adjacent said shaft to thereby guide said actuator elements into engagement with said notches of said pinion and from said notches into another portion of said path; and
   (e) at least one linear actuator supported by said housing and engaging one of said ends of said train of actuator elements, said linear actuator being selectively activated to push said train of discrete actuator elements through said actuator path to thereby serially engage said actuator elements with said notches of said pinion and thereby apply torque to said shaft.

2. A rotary actuator mechanism for applying torque to a shaft and comprising:
   (a) an actuator housing forming a U-shaped path including a pair of straight portions connected by a curved portion;
   (b) an actuator pinion rotatably supported in said housing and having said shaft secured thereto, said pinion having peripheral notches of a selected shape and positioned within said curved portion of said U-shaped path;
   (c) a train of discrete actuator elements having opposite ends and positioned in said U-shaped path, each of said actuator elements being of said selected shape to enable reception in said peripheral notches, at least one of said actuator elements engaging one of said notches;
   (d) said path being formed in part by a block extending into said pinion to position a surface thereof closely adjacent said shaft to thereby guide said actuator elements into engagement with said notches of said pinion and from said notches into said straight portions of said path; and
   (e) a pair of linear actuators supported by said housing and engaging said opposite ends of said train of actuator elements, said linear actuators being selectively and alternately activated to reversibly push said train of discrete actuator elements through said U-shaped path to thereby serially engage said actuator elements with said notches of said pinion and thereby apply torque to said shaft.

3. A mechanism as set forth in claim 2 wherein:
   (a) each of said discrete actuator elements is spherical in shape; and
   (b) said peripheral notches of said actuator pinion are spherical in shape and sized to received the spherical actuator elements.

4. A mechanism as set forth in claim 2 wherein:
   (a) said pair of linear actuators are positioned on a common side of said housing to provide a compact rotary actuator mechanism.

5. A mechanism as set forth in claim 2 wherein:
(a) said pair of linear actuators are positioned in spaced apart parallel relation on a common side of said housing to provide a compact rotary actuator mechanism.

6. A mechanism as set forth in claim 2 wherein:
(a) each of said linear actuators is a hydraulic actuator including a piston engaging a respective end of said train of actuator elements.

7. A mechanism as set forth in claim 2 and including:
(a) said housing being secured to a robotic arm member;
(b) a support structure being secured to said shaft; and
(c) said robotic arm member being pivoted relative to said support structure by selective application of torque to said shaft.

8. A mechanism as set forth in claim 2 and including:
(a) a first robotic arm member having said actuator housing secured thereto; and
(b) a second robotic arm member secured to said shaft and pivotable with respect to said first robotic arm by selective application of torque to said shaft.

9. A robotic arm assembly for generating relative pivoting motion between a robotic arm member and a second structure and comprising:
(a) an elongated robotic arm member;
(b) a second structure;
(c) a rotary actuator mechanism engaged between said robotic arm member and said second structure, said rotary actuator mechanism including:
  (1) an actuator housing forming a U-shaped path including a pair of straight portions and connected by a curved portion, said housing being secured to said robotic arm member;
  (2) an actuator pinion rotatably supported in said housing and having an actuator shaft secured thereto, said pinion having peripheral notches of a selected shape and positioned within said curved portion of said U-shaped path;
  (3) a train of discrete actuator elements having opposite ends and positioned in said U-shaped path, each of said actuator elements being of said selected shape to enable reception in said peripheral notches, a plurality of said elements engaging said notches;
  (4) said path being formed in part by a block extending into said pinion to position a curved surface thereof closely adjacent said shaft to thereby guide said actuator elements into engagement with said notches of said pinion and from said notches into one of said straight Portions of said path; and
  (5) a pair of linear actuators supported by said housing and engaging said opposite ends of said train of actuator elements, said pair of linear actuators being positioned within said robotic arm member and said linear actuators being selectively and alternately activated to reversibly push said train of discrete actuator elements through said U-shaped path to thereby serially engage said actuator elements with said notches of said pinion and thereby apply torque to said shaft; and
(d) said actuator mechanism generating said relative pivoting motion between said robotic arm member and said second structure by selective application of said torque to said shaft.

10. An assembly as set forth in claim 9 wherein:
(a) said robotic arm member is a first robotic arm member; and
(b) said second structure is a second robotic arm member.

11. An assembly as set forth in claim 9 wherein:
(a) each of said discrete actuator elements is spherical in shape; and
(b) said peripheral notches of said actuator pinion are spherical in shape and sized to received the spherical actuator elements.

12. An assembly as set forth in claim 9 wherein:
(a) each of said linear actuators is a hydraulic actuator including a piston engaging a respective end of said train of actuator elements; and
(b) said hydraulic actuators are positioned in spaced apart parallel relation.

13. A rotary actuator mechanism for applying torque to a shaft and comprising:
(a) an actuator housing forming a U-shaped path including a curved portion and a straight portion;
(b) an actuator pinion rotatably supported in said housing and having said shaft secured thereto, said pinion having peripheral notches of a spherical shape and positioned within said curved portion of said U-shaped path;
(c) a train of discrete spherical actuator elements having opposite ends and positioned in said U-shaped path, each of said actuator elements being sized to enable reception in said peripheral notches of said pinion, a plurality of said elements engaging said notches;
(d) said path being formed in part by a block extending into said pinion to position a curved surface thereof closely adjacent said shaft to thereby guide said actuator elements into engagement with said notches of said pinion and from said notches into said straight portion of said path; and
(e) a pair of linear hydraulic actuators supported by said housing and having respective hydraulic pistons engaging said opposite ends of said train of spherical actuator elements, said hydraulic actuators being selectively and alternately activated to reversibly push said train of spherical actuator elements through said U-shaped path to thereby serially engage said actuator elements with said notches of said pinion and thereby apply torque to said shaft.

14. A mechanism as set forth in claim 13 wherein:
(a) said pair of hydraulic actuators are positioned on a common side of said housing to provide a compact rotary actuator mechanism.

15. A mechanism as set forth in claim 13 wherein:
(a) said pair of hydraulic actuators are positioned in spaced apart parallel relation on a common side of said housing to provide a compact rotary actuator mechanism.

16. A mechanism as set forth in claim 13 and including:
(a) said housing being secured to a robotic arm member;
(b) a support structure being secured to said shaft; and
(c) said robotic arm member being pivoted relative to said support structure by selective application of torque to said shaft.

17. A mechanism as set forth in claim 13 and including:
(a) a first robotic arm member having said actuator housing secured thereto; and
(b) a second robotic arm member secured to said shaft and pivotable with respect to said first robotic arm by selective application of torque to said shaft.

18. A robotic arm assembly for generating relative pivoting motion between a robotic arm member and a second structure and comprising:
(a) an elongated robotic arm member;
(b) a second structure;

(c) a rotary actuator mechanism engaged between said robotic arm member and said second structure, said rotary actuator mechanism including:
  (1) an actuator housing forming a U-shaped path including a pair of straight portions positioned in spaced apart parallel relation and connected by a curved portion, said housing being secured to said robotic arm member;
  (2) an actuator pinion rotatably supported in said housing and having said shaft secured thereto, said pinion having peripheral notches of a spherical shape and positioned within said curved portion of said U-shaped path;
  (3) a train of discrete spherical actuator elements having opposite ends and positioned in said U-shaped path, each of said actuator elements being sized to enable reception in said peripheral notches of said pinion, a plurality of said elements engaging said notches;
  (4) said path being formed in part by a block extending into said pinion to position a curved surface thereof closely adjacent said shaft to thereby guide said actuator elements into engagement with said notches of said pinion and from said notches into one of said straight portions of said path; and
  (5) a pair of linear hydraulic actuators supported by said housing and having respective hydraulic pistons engaging said opposite ends of said train of spherical actuator elements, said hydraulic actuators being positioned within said robotic arm member and said hydraulic actuators being selectively and alternately activated to reversibly push said train of spherical actuator elements through said U-shaped path to thereby serially engage said actuator elements with said notches of said pinion and thereby apply torque to said shaft; and
(d) said actuator mechanism generating said relative pivoting motion between said robotic arm member and said second structure by selective application of said torque to said shaft.

19. An assembly as set forth in claim 18 wherein:
(a) said robotic arm member is a first robotic arm member; and
(b) said second structure is a second robotic arm member.

* * * * *